United States Patent
Syu et al.

(10) Patent No.: US 12,026,067 B2
(45) Date of Patent: Jul. 2, 2024

(54) BACKUP RESTORATION METHOD AND BACKUP RESTORATION DEVICE

(71) Applicant: Nippon Telegraph and Telephone Corporation, Tokyo (JP)

(72) Inventors: I Syu, Musashino (JP); Nobuhiro Kimura, Musashino (JP); Kotaro Mihara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 277 days.

(21) Appl. No.: 17/427,169

(22) PCT Filed: Jan. 17, 2020

(86) PCT No.: PCT/JP2020/001402
§ 371 (c)(1),
(2) Date: Jul. 30, 2021

(87) PCT Pub. No.: WO2020/158432
PCT Pub. Date: Aug. 6, 2020

(65) Prior Publication Data
US 2022/0129354 A1    Apr. 28, 2022

(30) Foreign Application Priority Data
Jan. 31, 2019  (JP) ................. 2019-015705

(51) Int. Cl.
*G06F 11/14* (2006.01)
(52) U.S. Cl.
CPC ...... *G06F 11/1469* (2013.01); *G06F 11/1451* (2013.01); *G06F 11/1466* (2013.01); *G06F 11/1484* (2013.01)

(58) Field of Classification Search
CPC ............. G06F 11/1469; G06F 11/1451; G06F 11/1466; G06F 11/1484; G06F 12/00
See application file for complete search history.

(56) References Cited

U.S. PATENT DOCUMENTS

| | | | |
|---|---|---|---|
| 10,901,857 B1 * | 1/2021 | Chopra | ................. G06F 3/0617 |
| 10,942,817 B1 * | 3/2021 | Sarda | .................. G06F 11/2094 |
| 2010/0299309 A1 | 11/2010 | Maki et al. | |

(Continued)

FOREIGN PATENT DOCUMENTS

| | | |
|---|---|---|
| JP | 2010271882 | 12/2010 |
| JP | 2015046664 | 3/2015 |
| JP | 2017167811 | 9/2017 |

OTHER PUBLICATIONS

Nakamura, "Guest OS state management with KVM snapshots," Jun. 22, 2015, retrieved from URL <https://qiita.com/TsutomuNakamura/items/4da7cd2f9d6a85f4db94>, 15 pages (With English Translation).

*Primary Examiner* — Michelle T Bechtold
*Assistant Examiner* — Tong B. Vo
(74) *Attorney, Agent, or Firm* — Fish & Richardson P.C.

(57) ABSTRACT

The present invention aims to reduce the amount of backup to be transferred, and reduce the recovery time, in the case of a server device built in a virtual environment. A VM 10 connects a plurality of volumes 21 and 22, starts up software installed on the volume 21 from the volume 21, stores DB data in the volume 22, and acquires snapshots of the volumes 21 and 22 at different intervals for each, thereby backing up the images 31 and 32.

6 Claims, 9 Drawing Sheets

(56) References Cited

U.S. PATENT DOCUMENTS

| | | | |
|---|---|---|---|
| 2015/0081641 A1* | 3/2015 | Brewer | G06F 11/1461 |
| | | | 707/654 |
| 2017/0359270 A1* | 12/2017 | Buil | H04L 67/1097 |
| 2017/0364415 A1* | 12/2017 | Formato | G06F 11/1464 |
| 2018/0267861 A1* | 9/2018 | Iyer | G06F 3/0619 |
| 2019/0272222 A1* | 9/2019 | Wei | G06F 3/0611 |
| 2020/0019468 A1* | 1/2020 | Chinnam | G06F 11/1453 |

* cited by examiner

BACKUP RESTORATION METHOD AND BACKUP RESTORATION DEVICE

CROSS-REFERENCE TO RELATED APPLICATIONS

This application is a National Stage application under 35 U.S.C. § 371 of International Application No. PCT/JP2020/001402, having an International Filing Date of Jan. 17, 2020, which claims priority to Japanese Application Serial No. 2019-015705, filed on Jan. 31, 2019. The disclosure of the prior application is considered part of the disclosure of this application, and is incorporated in its entirety into this application.

TECHNICAL FIELD

The present invention relates to backup and restoration technologies for a virtual environment.

BACKGROUND ART

Session control servers that require high availability employ an ACT-SBY configuration, and are backed up regularly. When an ACT type device fails, backup data or the like is restored and the service is immediately resumed. In addition, in preparation for damage to the currently-used building in which the currently-used device with an ACT-SBY configuration is installed, a device with the same configuration is to be installed in a remote building that is far away from the currently-used building. The backed-up data or the like is also transmitted to the remote building. When the currently-used building is damaged, the service is resumed using the device in the remote building.

Conventional backup and restoration will be described with reference to FIGS. 1 and 2. Here, an SIP server will be described as an example.

Memory data loaded to a memory is subjected to memory dump and written into a file once an hour, for example, and is backed up to an FS (file system). The backup file of the memory data is also transmitted to an FS in a remote building.

The middleware (MW), application software (APL), and DB data installed on the OS of the server device are formed into a file and are backed up to the FS, once a day. The backup file thus backed up includes the MW, the system file of the APL, and the DB data. This backup file is also transmitted to the FS in the remote building.

At restoration, as shown in FIG. 2, the backup file is transferred from the FS to a new server device, and thereafter pieces of software such as an OS, an MW, and an APL are started up and set, and the databased is updated. The OS, the MW, and the APL have already been installed on the new server device. Thereafter, the backup file of the memory data is transferred to the new server device, and the backup file of the memory data is loaded to the memory.

With the spread of virtual environments, it is envisaged that server devices, which are conventionally built on dedicated hardware, are also virtualized.

CITATION LIST

Non Patent Literature

[NPL 1] Tsutomu Nakamura, "KVM no snappushotto ni yoru gesuto OS no jyotai kanri", [online], Jun. 22, 2015, (searched on Dec. 20, 2018), the Internet <URL: https://qiita.com/TsutomuNakamura/items/4da7cd2f9d6a85f4db94>

SUMMARY OF THE INVENTION

Technical Problem

When an SIP server is virtualized, it is envisaged that the snapshot function of a virtual machine (VM) is used to perform processing for backing up DB data and system files. The snapshot function is the function of saving the state of the VM at a certain point in time. For example, as shown in FIG. 3, the snapshot of the VM is taken and an image of the VM is stored in the storage. By using the backed-up image at restoration, it is possible to start up the virtual machine in the state when the snapshot was taken. The image is also transferred to the remote building.

The image created using the snapshot function of the VM includes all of the OS, the MV, the APL and the DB data. Therefore, there is a problem in that the size of the image is large and the amount of transfer when the image is transferred to the remote building is large. Also, at restoration, the image is downloaded and is thereafter recovered. Therefore, there is a problem in that it takes a long time until recovery is complete.

The present invention has been made in view of the foregoing, and aims to reduce the amount of backup to be transferred, and reduce the recovery time, in the case of a server device built in a virtual environment.

Means for Solving the Problem

A backup restoration method according to the present invention is a backup restoration method for a virtual environment, including: connecting to each of a plurality of volume storages; starting up software installed on a volume storage of the plurality of volume storages, from the volume storage, to run a virtual machine; and backing up the plurality of volume storages at different intervals for each.

A backup restoration device according to the present invention is a backup restoration device that operates in a virtual environment, the backup restoration device including: connection means for connecting to each of a plurality of volume storages; startup means for starting up software installed on a volume storage of the plurality of volume storages, from the volume storage, to run a virtual machine; and backup means for backing up the plurality of volume storages at different intervals for each.

Effects of the Invention

According to the present invention, it is possible to reduce the amount of backup data to be transferred and reduce the recovery time in a server device built in a virtual environment.

DESCRIPTION OF EMBODIMENTS

The following describes an embodiment of the present invention with reference to the drawings.

Figure 1:
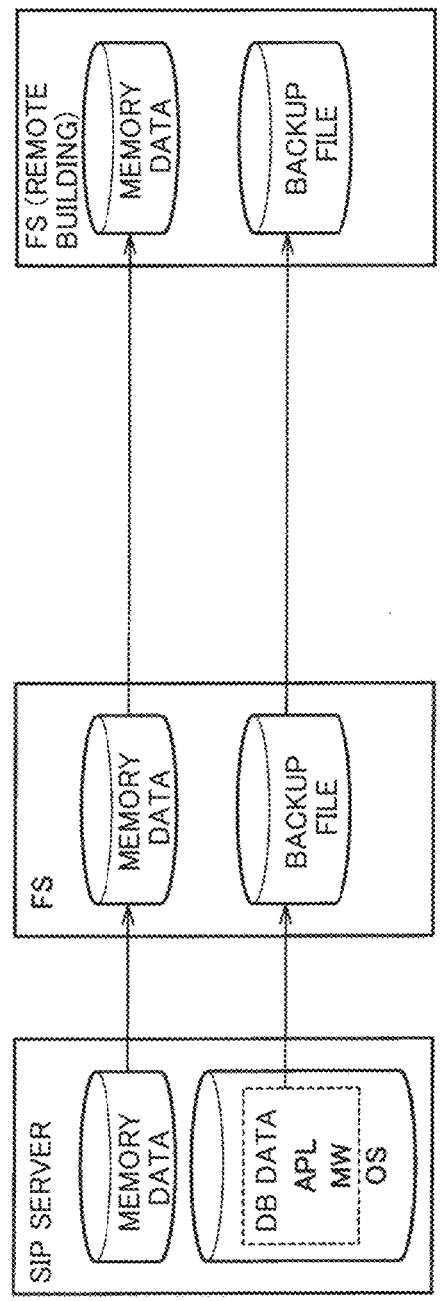
FIG. 1 is an overall configuration diagram for illustrating an outline of conventional backup.
Figure 2:
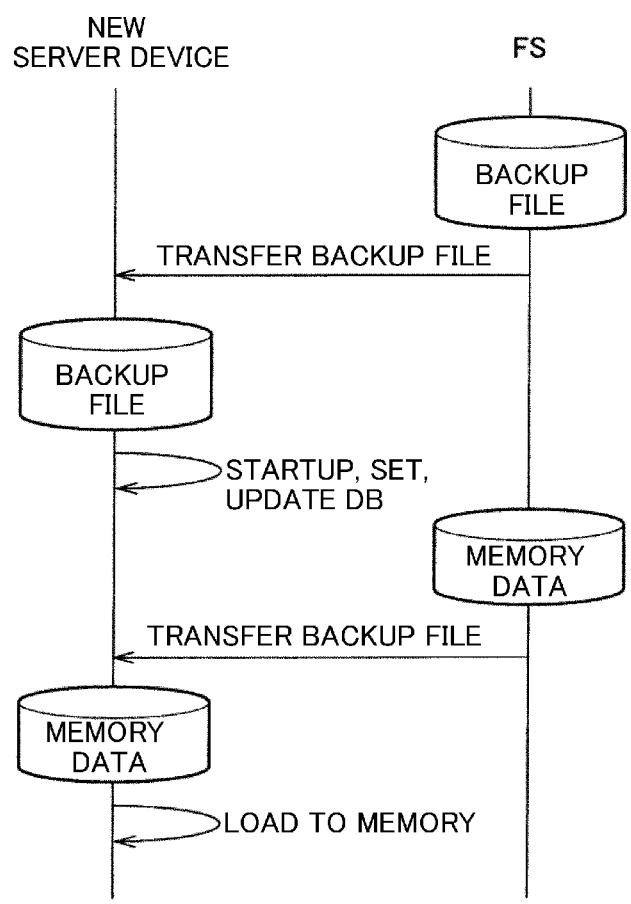
FIG. 2 is a sequence diagram for illustrating an outline of conventional restoration.
Figure 3:
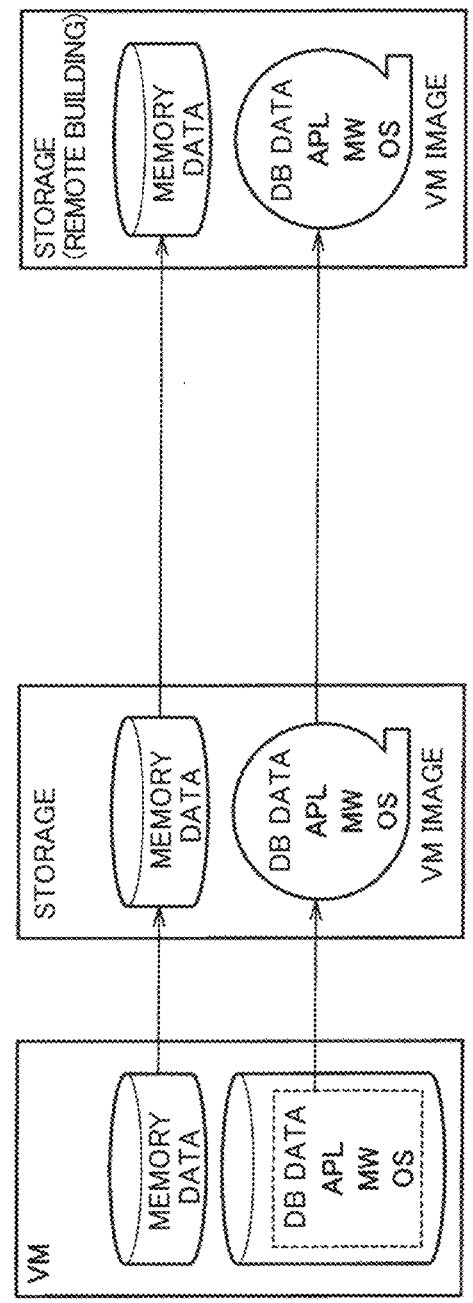
FIG. 3 is an overall configuration diagram for illustrating an outline of backup in a virtual environment.
Figure 4:
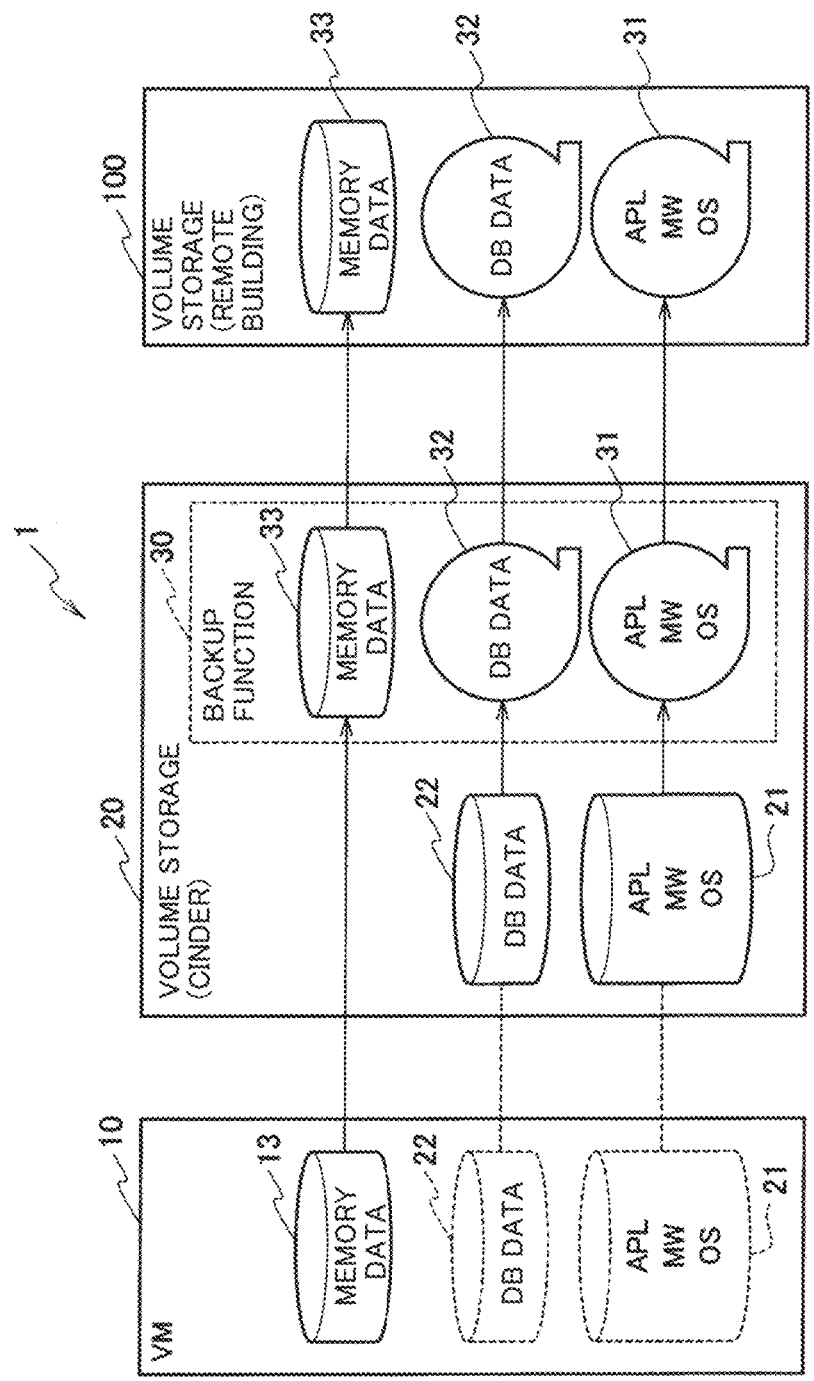
FIG. 4 is an overall configuration diagram for illustrating an outline of a backup restoration system according to an embodiment.

FIG. 4 is an overall configuration diagram for illustrating an outline of a backup restoration system according to an embodiment.

A backup restoration system 1 shown in FIG. 4 includes a virtual machine (VM) 10 that operates as an SIP server, and a volume storage 20 that provides the VM 10 with volumes (block storage devices).

The volume storage 20 provides the VM 10 with a volume 21 on which an OS, middleware (MW), and application software (APL) are installed, and a volume 22 in which DB data is stored. For example, Cinder of OpenStack may be used as the volume storage 20. Cinder is a service that provides a volume that is to be used by the virtual machine (an instance), and has the functions of creating/deleting a volume, creating/deleting a snapshot, and so on. The virtual machine can attach thereto the volume provided by Cinder, and use the volume.

The volume storage 20 has a backup function 30. The volume storage 20 creates respective images 31 and 32 of the volumes 21 and 22, using the snapshot function, and registers the images 31 and 32 in the backup function 30. For example, Glance of OpenStack may be used to register the images 31 and 32. Glance is a service that manages images on which, for example, an OS that is used for the virtual machine, is installed. By using images, it is possible to start up a virtual machine on which, for example, a necessary OS is installed, in a short time. It is possible to create the volumes 21 and 22 from the backed-up images 31 and 32 respectively, for example.

The backup function 30 stores a backup file 33 formed by performing memory dump on memory data. By loading the backup file 33 to the memory, it is possible to reproduce the backed-up memory data.

The backup restoration system 1 separately holds the volumes 21 and 22 according the frequency of change in the backup target, and determines backup intervals for each backup target. Specifically, for example, the OS, the MW, and the APL, which are changed at a low frequency, are installed on the volume 21, and are backed up at any time any time when software is updated. DB data, which is changed at a middle frequency, is installed on the volume 22, and is backed up once a day. On-memory data, which is changed at a high frequency, is backed up once an hour.

The images 31 and 32 and the backup file 33 stored by the backup function 30 are also transferred to a volume storage 100 in the remote building. The backup file 33 of memory data is the same as that of a conventional method. Regarding the conventional backup file formed by backing up software and DB data together, the OS, the MW, and the APL, and the DB data, are separated from each other and are respectively saved as separate images 31 and 32, and are backed up at different intervals. Therefore, the amount of image 32 transferred daily is reduced. The volume storage 100 in the remote building also uses Cinder.

The VM 10 attaches thereto the volumes 21 and 22 provided by the volume storage 20, and uses the storage. After attaching thereto the volume 21 on which applications and so on are installed, the VM 10 starts up the OS, the MW, and the APL from the volume 21, and operates as a SIP sever. That is to say, the VM 10 does not install the OS, the MW, or the APL on the local storage thereof, and starts up the OS, the MW, and the APL installed on the volume 21. The VM 10 attaches thereto the volume 22 in which the DB data is stored, and thereafter updates the database and so on in the volume 22. Data that is frequently accessed is loaded to the memory of the VM 10.

The VM 10 being stared up from the external volume storage 20, which may affect the system performance. However, the influence on the system performance is limited because the session control sever mainly performs on-memory processing. However, if the processing of writing to the disk is often performed, the influence may be large influence.

Figure 5:
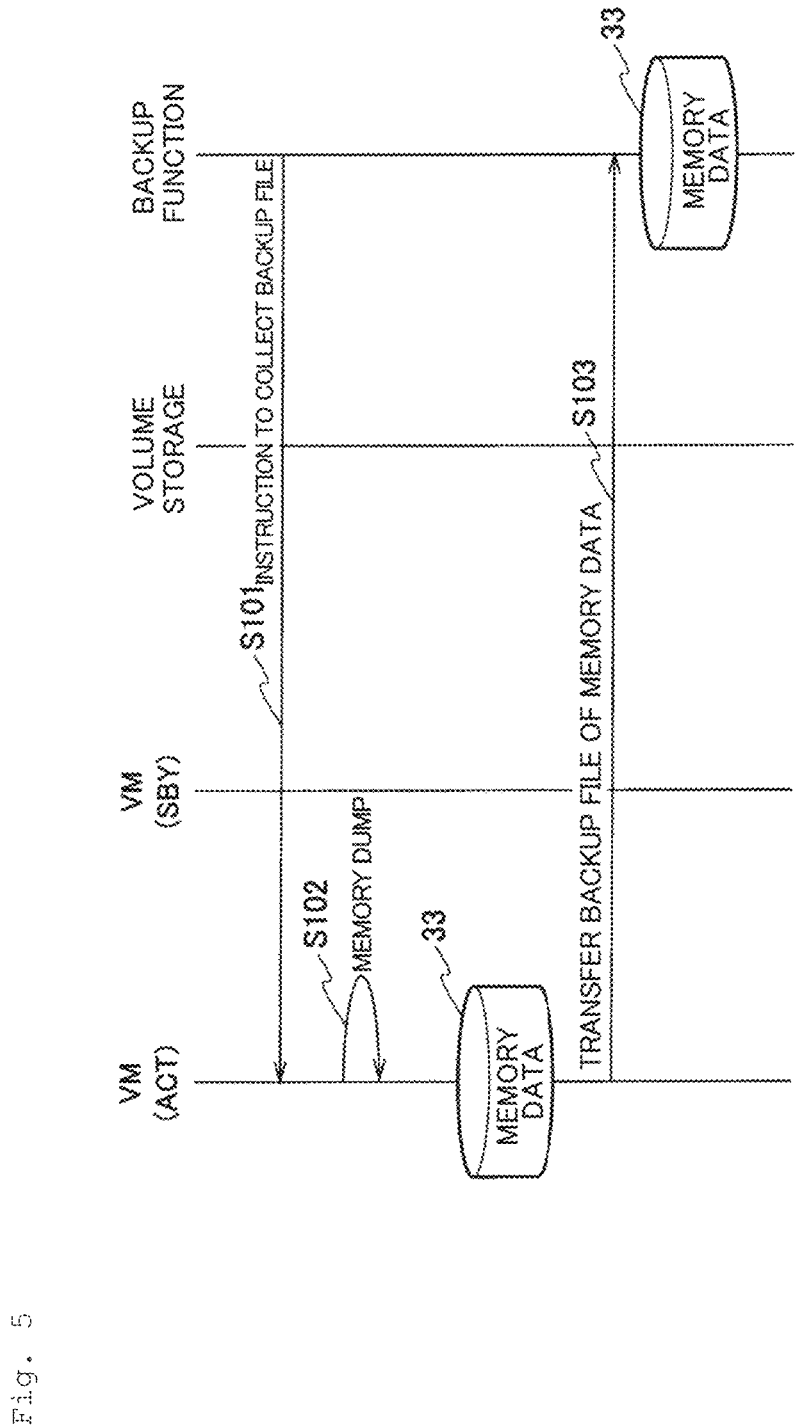
FIG. 5 is a sequence diagram showing the flow of processing performed to back up on-memory data.
Figure 6:
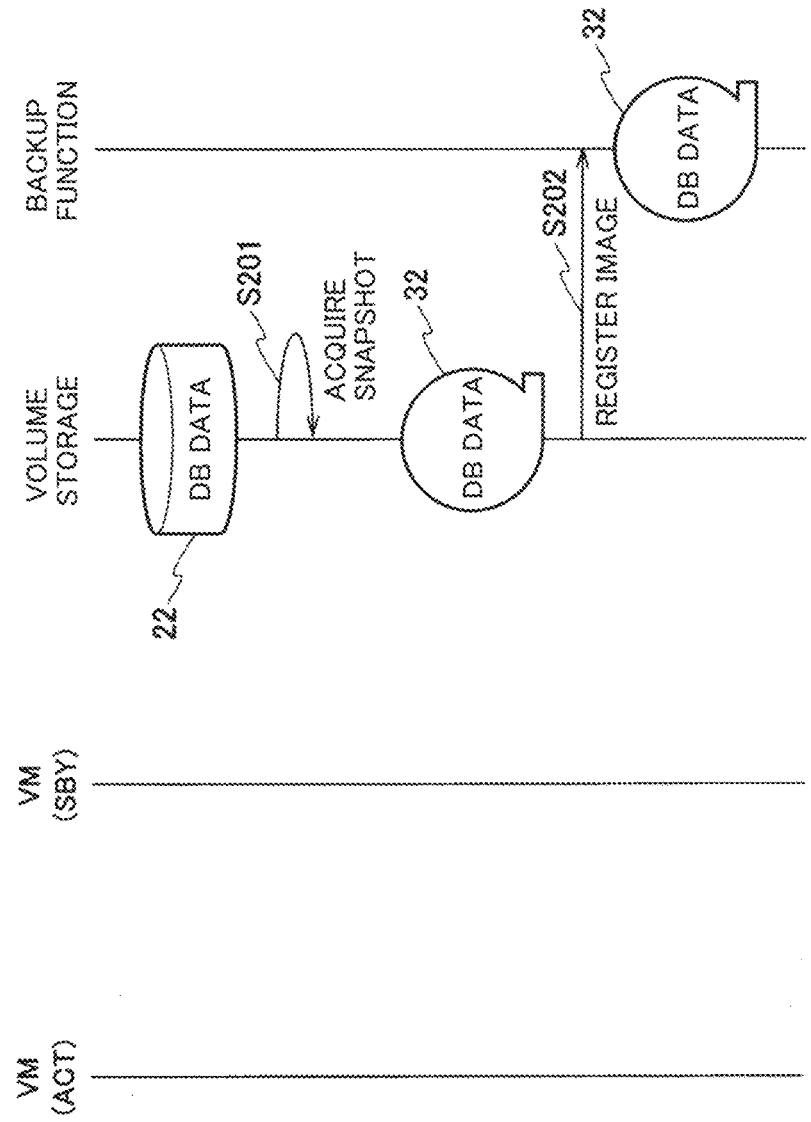
FIG. 6 is a sequence diagram showing the flow of processing performed to back up a volume that stores data.
Figure 7:
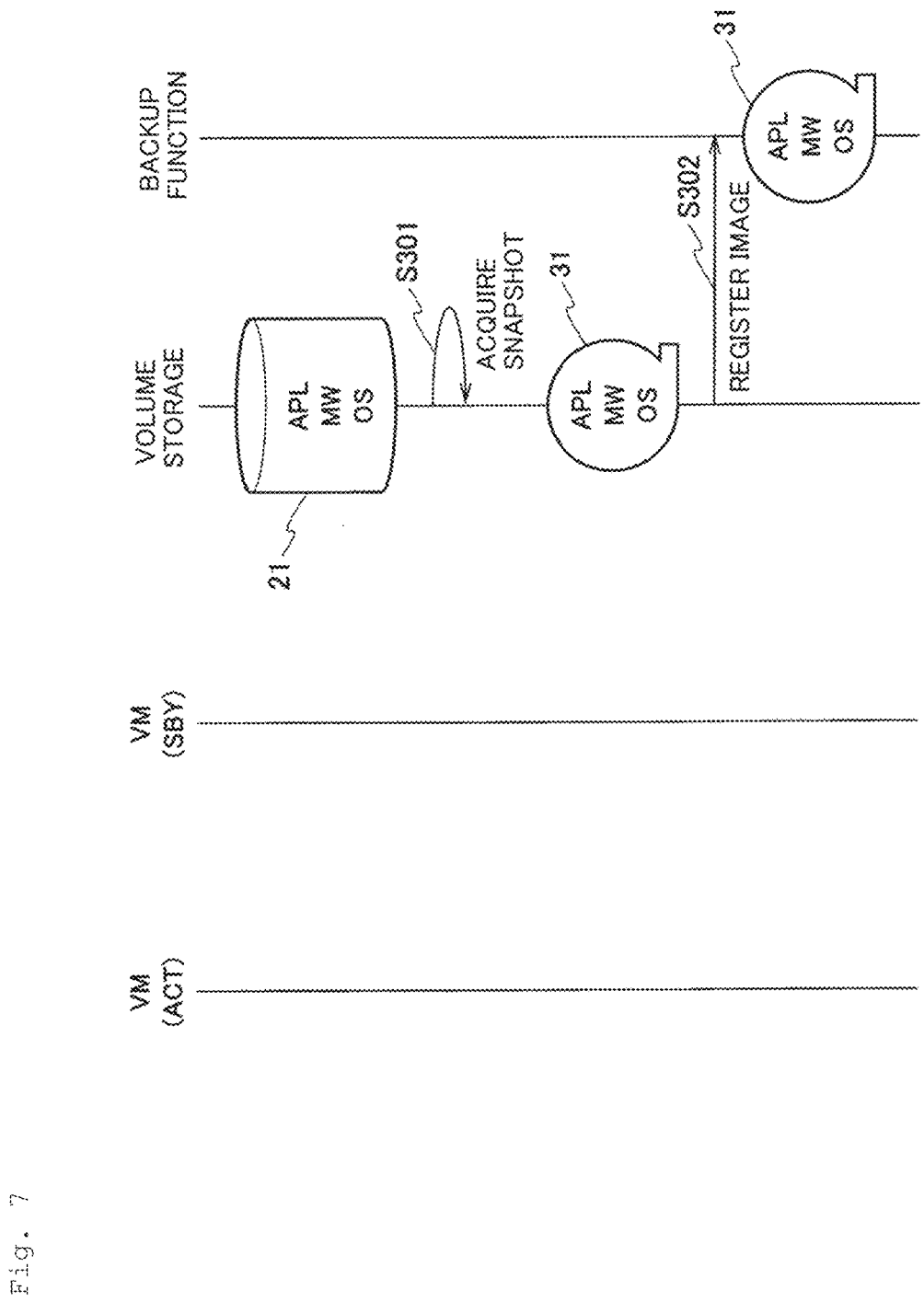
FIG. 7 is a sequence diagram showing the flow of processing performed to back up a volume on which software is installed.

Next, backup processing and restoration processing that are performed by the backup restoration system 1 will be described. FIGS. 5 to 7 are sequence diagrams showing the flow of backup processing performed by the backup restoration system 1.

With reference to FIG. 5, the backup of on-memory data will be described.

When the time to back up on-memory data is reached, the backup function 30 instructs the currently-used VM 10 to collect backup files (step S101).

The VM 10 performs memory dump to form the memory data into a file (step S102).

The VM 10 transfers the backup file 33 to the backup function 30, and the backup function 30 stores the backup file 33 (step S103). The backup file 33 is also transmitted to the remote building.

With reference to FIG. 6, the backup of DB data will be described.

When the time to back up DB data is reached, the volume storage 20 acquires a snapshot of the volume 22 in which the DB data is stored (step S201). The image 32 of the volume 22 is obtained from the sharpshot.

The volume storage 20 registers the image 32 of the volume 22 to the backup function 30 (step S202). The image 32 is also transferred to the remote building.

With reference to FIG. 7, the backup of the OS, the MW, and the APL will be described.

Upon software being updated, the volume storage 20 acquires a snapshot of the volume 21 on which the OS, the MW, and the APL are installed (step S301). The image 31 of the volume 21 is obtained from the sharpshot.

The volume storage 20 registers the image 31 of the volume 21 to the backup function 30 (step S302). The image 31 is also transferred to the remote building.

The processing shown in FIGS. 5 to 7 is performed according to the frequency of change in the backup target, and backup intervals are different for each backup target. Therefore, it is possible to reduce the total amount of transfer to the remote building.

Figure 8:
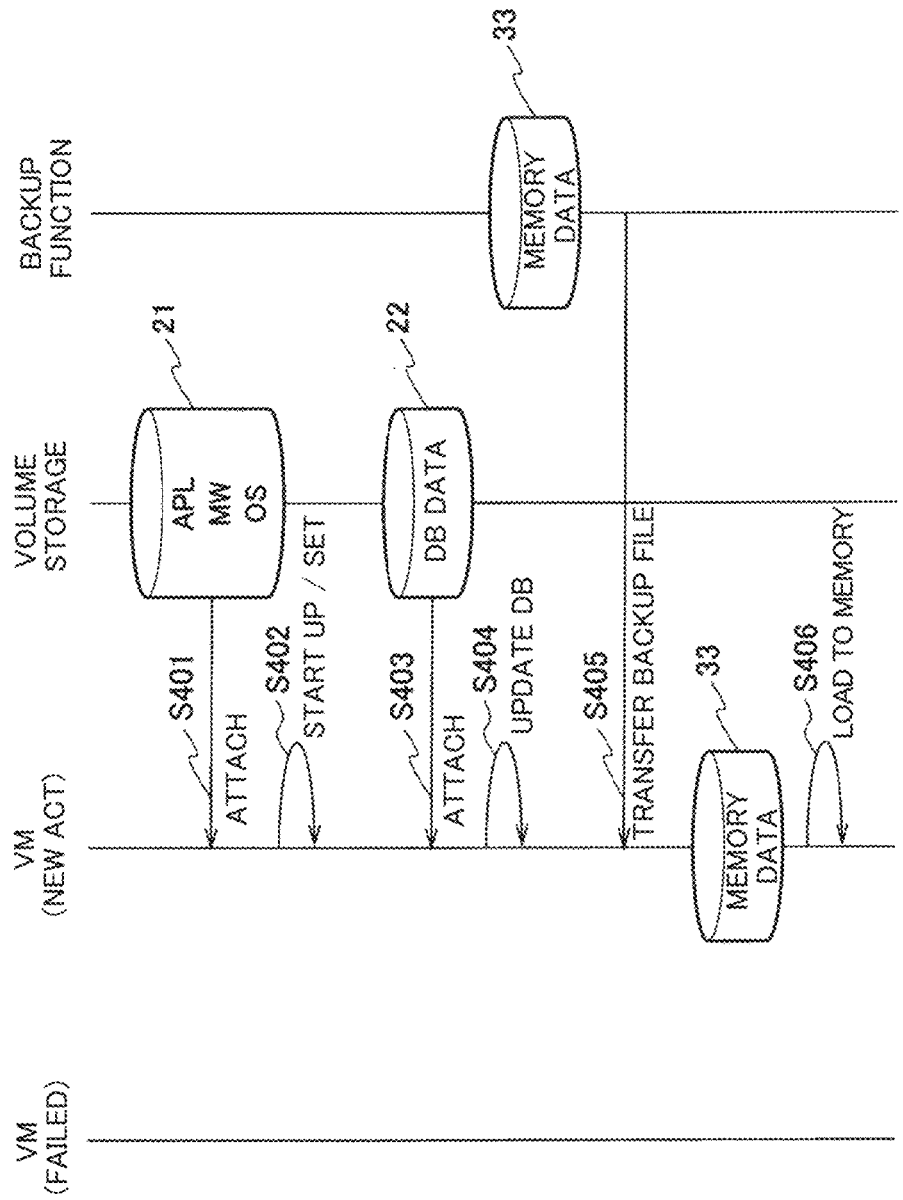
FIG. 8 is a sequence diagram showing the flow of restoration processing.

With reference to FIG. 8, restoration processing will be described. In FIG. 8, it is assumed that the VM in the ACT system fails has failed and the VM in the SBY system is activated instead. Note that the volume storage 20 has not failed.

The VM 10 attaches thereto the volume 21 on which software is installed, and starts up and sets the software (steps S401 and S402).

The VM 10 attaches thereto the volume 22 in which DB data is stored, and updates the database including the DB data and so on (steps S403 and S404).

The VM 10 receives the backup file 33 from the backup function 30, and loads memory data from the backup file 33 to the memory (steps S405 and S406).

As described above, at restoration, the VM 10 attaches thereto the volumes 21 and 22, and starts up software from the volume 21. Therefore, it is unnecessary to transfer the images 31 and 32 and operate the VM 10, and it is possible to reduce the restoration time.

Figure 9:
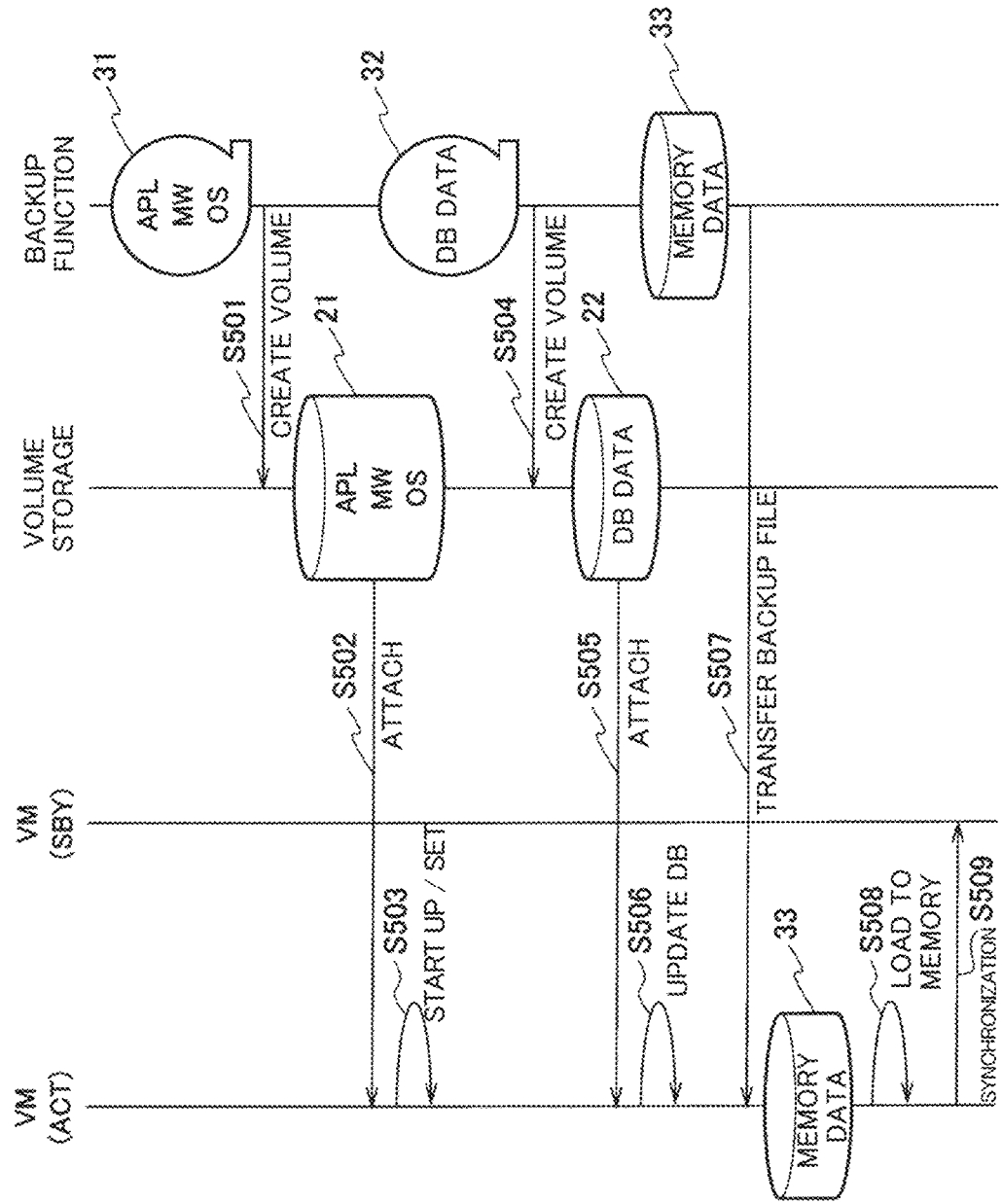
FIG. 9 is a sequence diagram showing the flow of processing for restoration from an image.

With reference to FIG. 9, the processing performed to start up the VM from a backed-up image. For example, when the currently-used building is damaged and the VM 10 and the volume storage 20 fail, there may be a case in which the service is resumed in the remote building. It is assumed that the backup function in the remote building holds the images 31 and 32 and the backup file 33 transferred from the currently-used building. The following processing is performed in the remote building.

The backup function 30 creates the volume 21 on which software is installed, from the image 31 (step S501).

The VM 10 attaches thereto the volume 21 on which software is installed, and starts up and sets the software (steps S502 and S503).

The backup function 30 creates the volume 22 in which DB data is stored, from the image 32 (step S504).

The VM 10 attaches thereto the volume 22 in which DB data is stored, and updates the database including the DB data and so on (steps S505 and S506).

The VM 10 receives the backup file 33 from the backup function 30, and loads memory data from the backup file 33 to the memory (steps S507 and S508). The VM 10 starts synchronizing with the VM in the SBY system (step S509).

As described above, according to the present embodiment, the VM 10 connects a plurality of volumes 21 and 22, starts up the software installed on the volume 21 from the volume 21, stores DB data in the volume 22, and acquires snapshots of the volumes 21 and 22 at different intervals for each, thereby backing up the images 31 and 32. Thus, it is possible to back up each of the volumes 21 and 22 at different intervals according to the frequency of change of the backup target, and reduce the total amount of transfer. Also, at restoration, the VM 10 attaches thereto the volumes 21 and 22, and starts up software from the volume 21. Therefore, it is unnecessary to transfer the images 31 and 32 formed by backing up the volumes 21 and 22, and it is possible to reduce the restoration time.

REFERENCE SIGNS LIST

1 Backup restoration system
10 Virtual machine (VM)
20 Volume storage
21, 22 Volume
30 Backup function
31, 32 Image
33 Backup file

The invention claimed is:

1. A backup restoration method for a virtual environment, comprising:
   connecting to a plurality of volume storages including (i) a first volume storage for a first backup target that changes at a first frequency, wherein the first volume storage includes software, and (ii) a second volume storage for a second backup target that changes at a second frequency, wherein the second volume storage includes database data;
   running a virtual machine by starting up the software installed on the first volume storage of the plurality of volume storages; and
   backing up the first backup target, as a first image on a remote storage, at a first interval corresponding to the first frequency, and backing up the second backup target, as a second image on the remote storage, at a second interval corresponding to the second frequency;
   determining that the first volume storage and the second volume storage failed;
   creating, from the first image of the remote storage, a new first volume storage that stores the software;
   attaching to the new first volume storage and starting up the software included in the new first volume storage; and
   creating, from the second image of the remote storage, a new second volume storage that stores the database data, and attaching to the new second volume storage.

2. The backup restoration method according to claim 1, further comprising:
   transferring images respectively backed up from the plurality of volume storages.

3. The backup restoration method according to claim 1, wherein the virtual machine operates as a session control server, and data in a database is stored in the second volume storage that is different from the first volume storage on which the software is installed.

4. A backup restoration device configured to perform operations comprising:
   connecting to a plurality of volume storages including (i) a first volume storage for a first backup target that changes at a first frequency, wherein the first volume storage includes software, and (ii) a second volume storage for a second backup target that changes at a second frequency, wherein the second volume storage includes database data;
   running a virtual machine by starting up the software installed on the first volume storage of the plurality of volume storages; and
   backing up the first backup target, as a first image on a remote storage, at a first interval corresponding to the first frequency, and backing up the second backup target, as a second image on the remote storage, at a second interval corresponding to the second frequency;
   determining that the first volume storage and the second volume storage failed;
   creating, from the first image of the remote storage, a new first volume storage that stores the software;
   attaching to the new first volume storage and starting up the software included in the new first volume storage; and
   creating, from the second image of the remote storage, a new second volume storage that stores the database data, and attaching to the new second volume storage.

5. The backup restoration device according to claim 4, wherein the operations further comprise:
   transferring images respectively backed up from the plurality of volume storages.

6. The backup restoration device according to claim 4, wherein the virtual machine operates as a session control server, and data in a database is stored in the second volume storage that is different from the first volume storage on which the software is installed.

\* \* \* \* \*